United States Patent
Llamas Sandin

(10) Patent No.: US 8,789,793 B2
(45) Date of Patent: Jul. 29, 2014

(54) AIRCRAFT TAIL SURFACE WITH A LEADING EDGE SECTION OF UNDULATED SHAPE

(75) Inventor: Raul Carlos Llamas Sandin, Madrid (ES)

(73) Assignee: Airbus Operations S.L., Getafe (ES)

( * ) Notice: Subject to any disclaimer, the term of this patent is extended or adjusted under 35 U.S.C. 154(b) by 0 days.

(21) Appl. No.: 13/349,885

(22) Filed: Jan. 13, 2012

(65) Prior Publication Data

US 2013/0056585 A1 Mar. 7, 2013

(30) Foreign Application Priority Data

Sep. 6, 2011 (ES) .................................. 201131462

(51) Int. Cl.
*B64D 15/00* (2006.01)
*B64C 3/14* (2006.01)

(52) U.S. Cl.
CPC ... *B64C 3/14* (2013.01); *Y02T 50/12* (2013.01)
USPC ....................... 244/134 E; 244/35 R; 244/198

(58) Field of Classification Search
CPC .......... B64D 15/00; B64D 15/16; B64C 3/10; B64C 5/02; B64C 3/14
USPC ...................................... 244/134 E, 35 R, 198
See application file for complete search history.

(56) References Cited

U.S. PATENT DOCUMENTS

| 2,358,985 | A | * | 9/1944 | McAndrew | 244/201 |
| 4,323,209 | A | * | 4/1982 | Thompson | 244/199.1 |
| 6,431,498 | B1 | * | 8/2002 | Watts et al. | 244/198 |
| 2012/0061522 | A1 | * | 3/2012 | Sullivan et al. | 244/198 |

* cited by examiner

*Primary Examiner* — John Woodrow Eldred
(74) *Attorney, Agent, or Firm* — Oblon, Spivak, McClelland, Maier & Neustadt, L.L.P.

(57) ABSTRACT

An aircraft tail surface, such as a horizontal tail plane or a vertical tail plane, including a leading edge having, in at least a section along the tail span, an undulated shape formed by a continuous series of smooth protrusions and recesses so that, in icing conditions, the ice accretion is produced only on the peaks of the protrusions and on the bottoms of the recesses, thereby creating a channeled airflow and an arrangement of air vortices which impart energy to the airflow in the aerofoil boundary layer which delay the airflow separation that causes the stall, thus reducing the detrimental effects of ice accretion in its aerodynamic performance.

8 Claims, 4 Drawing Sheets

AIRCRAFT TAIL SURFACE WITH A LEADING EDGE SECTION OF UNDULATED SHAPE

FIELD OF THE INVENTION

The present invention refers to aircraft tail surfaces and more in particular to a configuration of an aircraft tail surface for improving its aerodynamic performance in icing conditions.

BACKGROUND OF THE INVENTION

The performance of aircraft tail surfaces, particularly the horizontal tail plane and the vertical tail plane, is one of the more important issues in global aircraft design because said surfaces are used as control surfaces that must provide stabilizing forces even at high angles of attack to restore the aircraft attitude.

Tail stall angle is a design constraint related to the safety of the aircraft flight and is determined by the taper and aspect ratio of the surface as well as, among other design features, the aerofoil thickness and leading edge shape, so that the aircraft industry is constantly demanding new designs of tail surfaces that allow delaying stall, particularly in icing conditions.

Regarding wings, U.S. Pat. No. 6,431,498 discloses an apparatus to modify a wing to provide increased lift over drag ratios compared to similar wings with straight leading edges forming a plurality of protrusions (inspired on the tubercles on the leading edges of humpback whale flippers) spaced laterally along the leading edge, the protrusions creating a smoothly varying, alternately forward-and-aft sweep along the leading edge relative to the upstream flow direction along the leading edge. One of the effects of said modification is the delay of stall at high angles of attack.

The maximum lift coefficient of wings is an important consideration for the design of wings and there are very effective high lift devices used in the aircraft industry to increase the wing lift coefficient in order to reduce the stall speed enabling the safe flight at low speeds. Trailing edge devices, like flaps, produce an increment of lift coefficient while maintaining the same angle of attack of the wing. Leading edge devices, like slats, droop noses, dog-teeth, serrated leading edges and aerodynamic fences, enable an increase of the stall angle and therefore of the ultimate lift coefficient. A crucial consideration in the design of wings is to reduce the drag in cruise configuration so it is desirable that whatever high lift devices are used cause a small drag increase. Movable leading edge devices, like slats and droop noses can be retracted so that the wing aerofoil shape in cruise is not perturbed. Therefore, in cruise condition, the maximum stall angle of the wing corresponds to the "clean wing" configuration, i.e., without high lift devices. Fixed leading edge devices, like dog teeth, fences, etc. . . . , cause a drag increase in cruise and are therefore avoided in the design of high performance wings like those of modern commercial transport aircraft.

When an aircraft encounters a flight situation such that the wing may stall (as a consequence of severe turbulence which may upset the aircraft attitude or in the case of flight through a region of the atmosphere with icing conditions, where ice can be accrued in the wing leading edge, breaking the aerodynamic smoothness of the aerofoil), it is essential that the tail surfaces remain effective in providing sufficient aerodynamic forces to restore the aircraft attitude. An important design requirement for the aircraft tail surfaces is, therefore, that their stall angle is greater than that of the wing, even in icing conditions.

During flight at low speed, where the wing high lift systems are deployed, the wing is liable to stall if the pilot inadvertently flies below the stall speed or performs an unusual maneuver which increases the angle of attack beyond the stall angle of the wing. In this condition, it is essential that the tail surface provides sufficient aerodynamic forces even with the rudder or elevator deflected and, particularly in icing conditions, where there may be ice accrued on the tail leading edge.

It must be noted that in order for the tail surfaces to generate aerodynamic forces in situations where the wing may be stalled, the critical design condition is that the tail stall angle be larger than that of the wing.

It is clear that an essential design requirement for aircraft tail surfaces is the stall angle, this being much more important in the case of tails than in the case of wings, where aerodynamic "finesse" (ratio of lift to drag in cruise) and maximum lift coefficient (at the lowest angle of attack possible, to minimize fuselage drag and risk of tail strike on the ground) are the most important aerodynamic design requirements.

In particular, tail stall angle in icing conditions, when it is assumed that the tail leading edge has an ice form which breaks the aerofoil smoothness and thus reduces the maximum lift coefficient, is a crucial design consideration for modern commercial aircraft. There are several accidents documented where the root cause has been the stall of the tail in icing conditions and therefore the loss of control of the aircraft.

There are known methods to minimize ice accretion on the tail surfaces consisting on heating the leading edge or on having a flexible leading edge which can be inflated with the aim of preventing the formation of ice on the leading edge or breaking the ice once it has formed. The operation of these devices requires a positive action from the pilot who activates them if atmospheric icing conditions are detected. These methods not only are costly to install and maintain but carry the risk of not being operative when required, without prior indication.

Thus it is clear that passive means to prevent ice accretion on the leading edge would be preferred.

The present invention is intended to the attention of said demand.

SUMMARY OF THE INVENTION

It is an object of the present invention to provide an aircraft tail surface with an improved aerodynamic performance in icing conditions.

It is another object of the present invention to provide an aircraft tail surface that reduces the detrimental effects of ice accretion in icing conditions.

These and another objects are met by an aircraft tail surface comprising a leading edge having in at least a section along the tail span an undulated shape formed by a continuous series of smooth protrusions and recesses so that, in icing conditions, the ice accretion is produced only on the peaks of said protrusions and on the bottoms of said recesses, thereby creating a channeled airflow and an arrangement of air vortices which impart energy to the airflow in the aerofoil boundary layer which delay the airflow separation that causes the stall, thus reducing the detrimental effects of ice accretion in its aerodynamic performance.

In embodiments of the present invention said leading edge section having an undulated shape is comprised between the 60%-100% of the tail span. Therefore the means for improving the aerodynamic performance of the tail surface is placed in the tail surface region of stall onset.

In embodiments of the present invention, said undulated shape comprises convex or concave surfaces between protrusion peaks and recesses bottoms and convex surfaces between recesses bottoms and protrusion peaks; or convex surfaces between protrusion peaks and recesses bottoms and concave surfaces between recesses bottoms and protrusion peaks. Three configurations of the undulated leading edge section defining three different shapes of the stagnation points where an ice accretion is to be expected in icing conditions are, therefore, provided as alternative configurations for being considered for a given tail surface.

In embodiments of the present invention for, particularly, tail planes of a tapered trapezoidal planform, said undulated shape is configured so that hypothetical tangent planes to the convex surfaces between recesses bottoms and protrusion peaks in a middle area between them are parallel planes between them and to an hypothetical tangent plane to the leading edge section without an undulated shape, or form increasing angles with an hypothetical tangent plane to the leading edge section without an undulated shape in the direction to the tail surface tip. Two configurations of the undulated leading edge section defining two orientations of said protrusions and recesses are therefore provided as alternative configurations for being considered for a given tail surface.

The invention is particularly applicable to horizontal tail planes and vertical tail planes of aircrafts.

Other characteristics and advantages of the present invention will be clear from the following detailed description of embodiments illustrative of its object in relation to the attached figures.

DETAILED DESCRIPTION OF THE INVENTION

Figure 1:
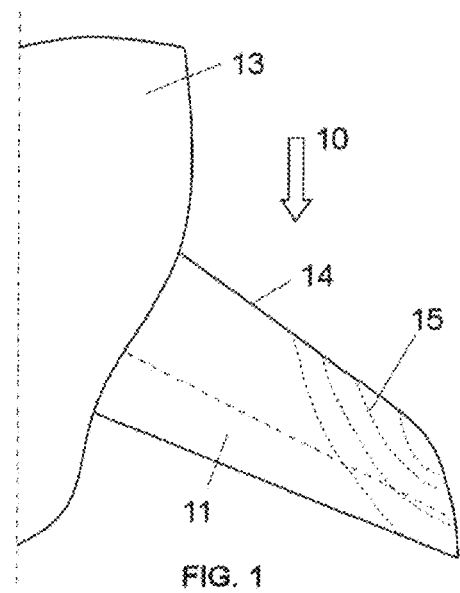
FIG. 1 shows schematically the region of stall onset in a horizontal tail plane of an aircraft.

FIG. 1 shows a conventional aircraft horizontal tail plane 11 with a straight leading edge 14 attached to the aircraft fuselage 13 and the region 15 of stall onset. Arrow 10 indicates the flow direction.

Figure 2:
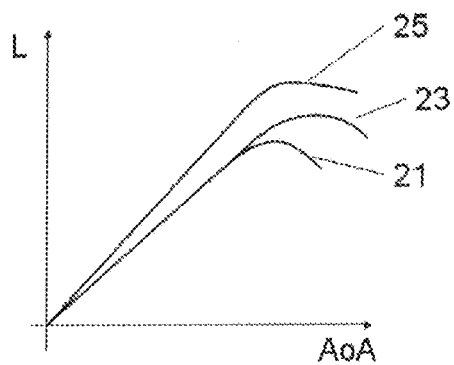
FIG. 2 show typical Lift vs. Angle of Attack diagrams for aircraft tail surfaces in different conditions.

FIG. 2 shows Lift vs. Angle of attack curves 21, 23, 25 for the horizontal tail plane of FIG. 1 in, respectively, a situation with icing on the leading edge of a tail plane without any special device to delay stall in icing conditions, a situation with icing on the leading edge with undulations as per the present invention, and a situation without icing. These curves show clearly that reducing the detrimental effect of ice accretion is a primary driver for delaying stall.

Figure 3A:
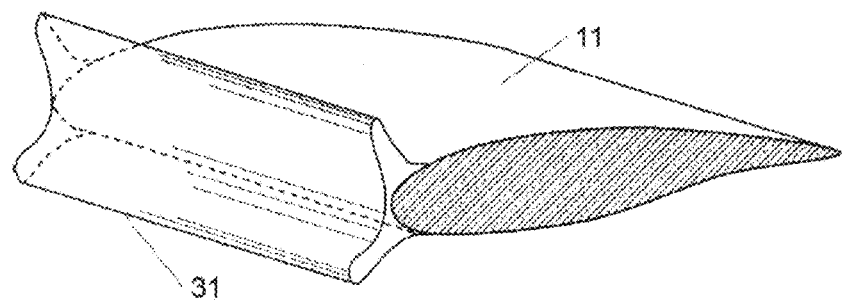
FIG. 3a shows the shape of ice accretion in the leading edge of a conventional aircraft tail surface and FIG. 3b shows its aerodynamic effects.
Figure 3B:
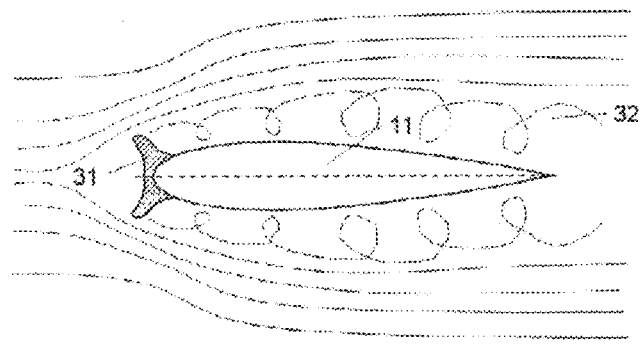

The loss of maximum lift capability and reduced stall angle with ice accretion is due to, as shown in FIGS. 3a and 3b, the flow separation 32 caused by the ice accretion 31 on the leading edge of the horizontal tail plane 11.

Figure 4A:
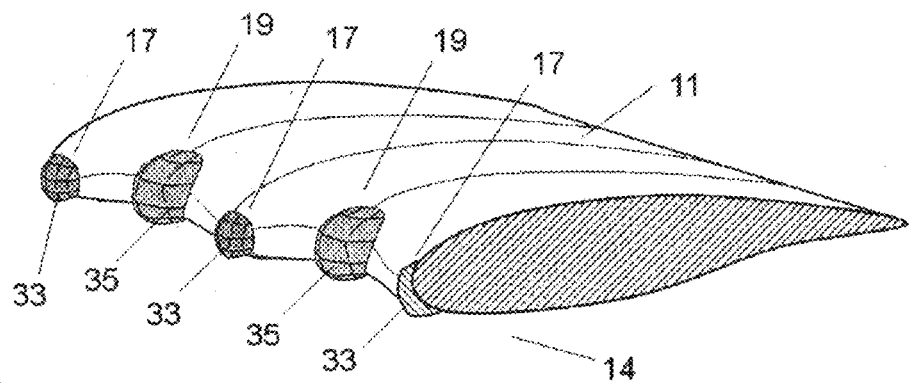
FIG. 4a shows the ice accretion in the leading edge of an aircraft tail surface according to the present invention and FIG. 4b shows its aerodynamic effects.
Figure 4B:
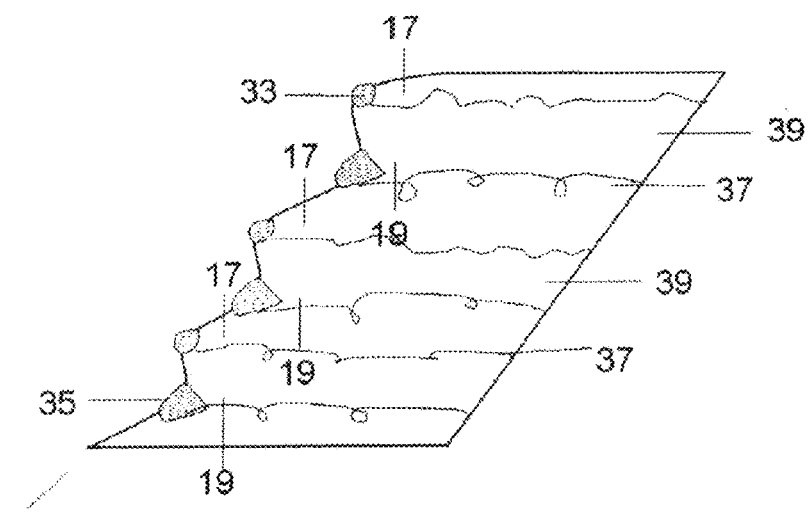

FIGS. 4a and 4b illustrates the basic idea of the present invention. Having a horizontal tail plane 11 with a leading edge 14 of an undulated shape formed by a continuous series of protrusions 17 and recesses 19 it is achieved that the ice accretions 33, 35 are produced only on the stagnation points of the leading edge, i.e. the peaks of protrusions 17 and the bottoms of recesses 19. Consequently the separated flow 37 is limited to the sections influenced by said ice accretions 33, 35 while in the remaining sections an adhered flow 39 can be found.

Figure 5:
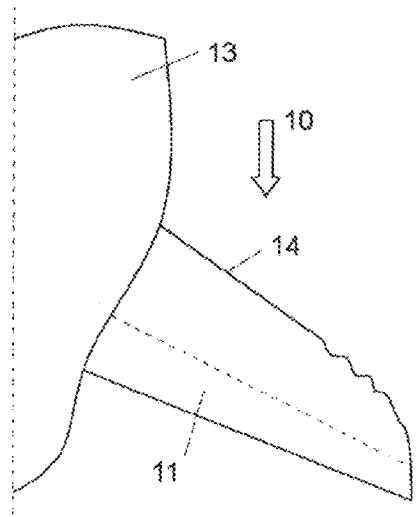
FIG. 5 shows a horizontal tail plane with a leading edge having an undulated shape according to the present invention.

FIG. 5 shows a horizontal tail plane 11 with a leading edge 14 of an undulated shape in a section comprised between 60%-100% of the tail span, which is the region of the tail plane where the stall will typically initiate and which can benefit from the protection provided by the undulated leading edge.

Figure 6A:
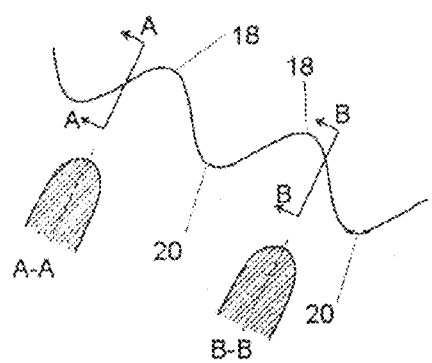
FIGS. 6a, 6b and 6c show embodiments of the undulated leading edge of the horizontal tail plane of FIG. 5.
Figure 6B:
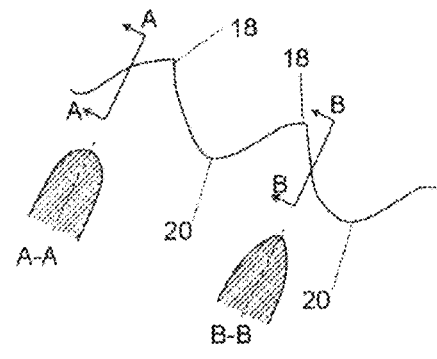
Figure 6C:
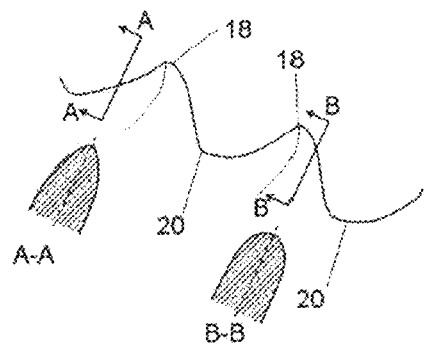

Said undulated shape can be configured as shown in FIG. 6a comprising convex surfaces between protrusion peaks 18 (involving rounded endings in their transversal sections) and recesses bottoms 20 and also convex surfaces between recesses bottoms 20 and protrusion peaks 18 or, as shown in FIG. 6b, comprising concave surfaces between protrusion peaks 18 and recesses bottoms 20 (involving sharp edges in their transversal sections) and convex surfaces between recesses bottoms 20 and protrusion peaks 18 or, as shown in FIG. 6c, comprising convex surfaces between protrusion peaks 18 and recesses bottoms 20 and concave surfaces between recesses bottoms 20 and protrusion peaks 18.

We will now refer to a preferred embodiment for a horizontal tail plane of the classical aft-swept, tapered trapezoidal planform. It is well known that in these type of planforms the stall initiates near the tip of the lifting surface and therefore this is the region which should be protected by any device or local means to delay the stall.

Figure 7:
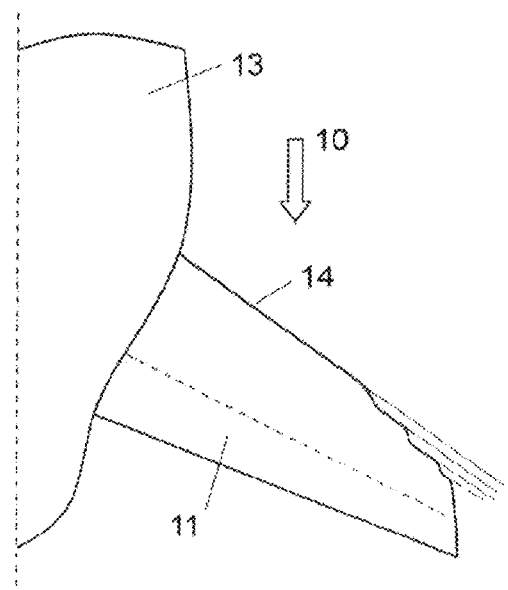
FIG. 7 shows a horizontal tail plane of a typical trapezoidal planform with a leading edge having an undulated shape according to the present invention.

FIG. 7 shows a horizontal tail plane 11 of a tapered trapezoidal planform with a leading edge 14 of an undulated shape formed by a continuous series of protrusions 17 and recesses 19 comprising convex surfaces between protrusion peaks 18 and recesses bottoms 20 and also between recesses bottoms 20 and protrusion peaks 18.

Figure 8A:
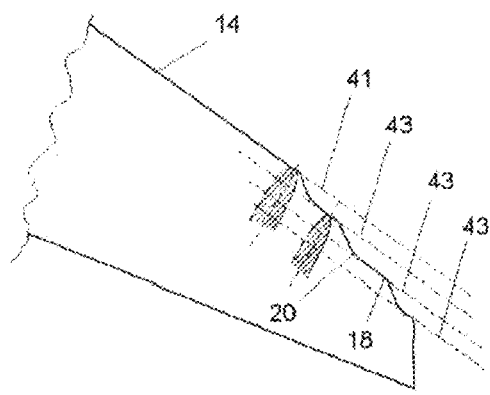
FIGS. 8a and 8b are enlarged views of embodiments of the undulated leading edge of the horizontal tail plane of FIG. 7.

In the embodiment shown in FIG. 8a the undulated shape is configured so that hypothetical tangent planes 43 to said convex surfaces in a middle area between recesses bottoms 20 and protrusion peaks 18 will be parallel planes between them and to an hypothetical tangent plane 41 to the leading edge section without an undulated shape. As shown in FIG. 8a the leading edge transversal section in said middle areas is thinner than in the convex surfaces between protrusion peaks 18 and recesses bottoms 20.

Figure 8B:
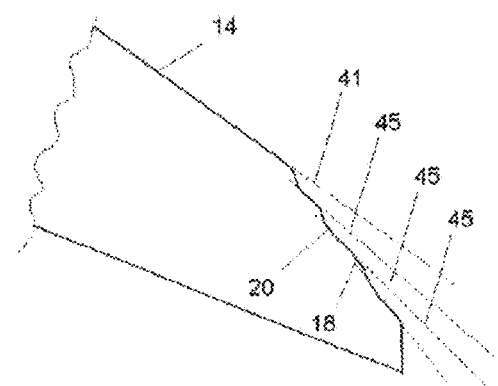

In the embodiment of FIG. 8b the undulated shape is configured so that hypothetical tangent planes 45 to said convex surfaces in a middle area between recesses bottoms 20 and protrusion peaks 18 will form increasing angles with an hypothetical tangent plane 41 to the leading edge section without an undulated shape in the direction to the tail surface tip.

As the skilled man will readily understood all the preceding paragraphs are also applicable to vertical tail planes.

Although the present invention has been fully described in connection with preferred embodiments, it is evident that modifications may be introduced within the scope thereof, not considering this as limited by these embodiments, but by the contents of the following claims.

The invention claimed is:

1. An aircraft tail surface, comprising:
    a leading edge having a first section, extending between 0%-60% of a length of the leading edge, without an undulated shape and a second section, extending between 60%-100% of the length of the leading edge, with an undulated shape formed by a continuous series of smooth protrusions and recesses that includes a first undulation comprising a first protrusion peak, a first recess bottom, a second recess bottom, a convex surface extending continuously between the first protrusion peak and the first recesses bottom, and a concave surface extending continuously between the first protrusion peak and the second recesses bottom so that, in icing conditions, ice accretion is produced only on peaks of said protrusions and on bottoms of said recesses, thereby creating a channeled airflow and an arrangement of air vortices which impart energy to the airflow in an aerofoil boundary layer which delay airflow separation that causes a stall, thus reducing detrimental effects of the ice accretion to aerodynamic performance of the tail surface.

2. An aircraft tail surface according to claim 1, wherein a planform of the tail surface is a tapered trapezoidal planform.

3. An aircraft tail surface according to claim 1, wherein said tail surface is a horizontal tail plane.

4. An aircraft tail surface according to claim 1, wherein said tail surface is a vertical tail plane.

5. An aircraft tail surface according to claim 1, wherein each undulation of said undulated shape comprises a first protrusion peak, a first recess bottom, a second recess bottom, a convex surface extending continuously between the first protrusion peak and the first recesses bottom, and a concave surface extending continuously between the first protrusion peak and the second recesses bottom.

6. An aircraft tail surface according to claim 5, wherein said undulated shape is configured so that hypothetical tangent planes to the convex surfaces between the recesses bottoms and the protrusion peaks in a middle area between them are parallel planes between them and to a hypothetical tangent plane to the first section without an undulated shape.

7. An aircraft tail surface according to claim 5, wherein said undulated shaped is configured so that hypothetical tangent planes to the convex surfaces between the recesses bottoms and the protrusion peaks in a middle area between them form increasing angles with a hypothetical tangent plane to the first section without an undulated shape in the direction to a tail surface tip.

8. An aircraft, comprising:
    a fuselage; and
    the tail surface according to claim 1, the tail surface being attached to the fuselage.

* * * * *